3,328,467
CONDENSATION OF ALKYLENE OXIDES
Lyle A. Hamilton, Pitman, N.J., assignor to Mobil Oil
Corporation, a corporation of New York
No Drawing. Filed Oct. 25, 1963, Ser. No. 318,807
16 Claims. (Cl. 260—615)

This invention relates to condensation of alkylene oxides in the presence of an aluminosilicate having unique catalytic activity and, in particular, to condensation of alkylene oxides with a compound containing an active hydrogen atom in the presence of such catalyst.

This invention contemplates effecting reaction of alkylene oxides with compounds having an active hydrogen atom in the presence of a catalyst prepared from naturally occurring or synthetic aluminosilicates that have active cation sites within an ordered internal structure. These cation sites are formed by the presence of certain exchangeable metal and/or hydrogen cations ionically bonded or chemisorbed within the ordered internal structure of the aluminosilicate; preferably, the cations are such that certain aluminosilicates contain a high concentration of hydrogen sites.

Furthermore, this invention concerns a process for effecting reaction of an alkylene oxide and an organic compound containing hydroxy, mercapto, amino groups or the like, under certain reaction conditions in the presence of the aforementioned aluminosilicate catalysts. In addition, this invention is concerned with a process for the production of acyclic organic compounds including glycol ethers, hydroxy thioethers, and hydroxy amines, and the like, by effecting the heretofore described reactions in the presence of the designated aluminosilicate catalysts.

In particular, this invention is directed to the synthesis of monoethers and mono esters of glycol and polyglycols and derivatives thereof by effecting reaction of ethylene oxide and a hydroxy compound at certain reaction conditions in the presence of the described aluminosilicate catalyst.

In accordance with this invention, it has been found that alkylene oxides and organic compounds containing an active hydrogen atom, i.e. hydroxy, mercapto, amino, and the like groups, can be reacted to produce acyclic compounds such as glycol ethers, hydroxy thioethers, amino alcohols, and the like, in the presence of an aluminosilicate catalyst having exchangeable metal and/or hydrogen cations within its ordered internal structure. These cations may be present within the catalyst by base exchanging cations of synthetic or naturally occurring aluminosilicates, by incorporating the cations during the formation of a synthetic aluminosilicate, or by being an integral portion of a naturally occuring aluminosilicate. In general, the unique activity of the aluminosilicate catalyst for producing these acyclic compounds is dependent on the nature and concentration of its active cation sites as well as the availability of these sites for contact with the reactants.

A variety of alkylene oxides or substituted derivatives thereof, may be employed as reactants for the process of this invention. These oxides include ethylene oxide, propylene oxide, butene-1 oxide, butene-2 oxide, butadiene monooxide, butadiene dioxide, cyclopentylene oxide, styrene oxide, cyclo hexyl ethylene oxide, isoprene oxide, and the like. Substituted alkylene oxides which may also be employed are 1-chloro-2,3-butylene oxide, 1-hydroxy-3,4-butylene oxide, epichlorohydrin, epibromohydrin, p-chlorostyrene oxide, p-amino styrene oxide, and the like. In addition, other epoxy compounds derived from the alkylene oxides, i.e., nitroglycidyl, nitrostyrene oxide, methyl glycidyl ether, isopropyl glycidyl ether, and the like compounds. The preferred class of oxides consists of ethylene oxide and homologs thereof.

Among the compounds containing an active hydrogen atom that may be used as reactants for the instant process are acylic (straight and branched chain), alicyclic and cyclic alcohols, thiols, amines, and the like. Representative of these reactants are aliphatic alcohols such as the alkanols, e.g., methyl alcohol, ethyl alcohol, propyl alcohol, isopropyl alcohol, butyl alcohol, benzyl acohol, and the like; glycols such as the alkanediols, e.g., ethylene glycol, propanediol, butanediol, and the like; phenols such as phenol, cresols, xylenols, durenol, resorcinol, orcinol, and the like; thiols such as the alkanethiols, e.g., ethanethiol, 1-butanethiol, 1,2-ethanedithiol, and the like, and the arylthiols, e.g., benzene thiol, toluene thiol, p-chloro-thiophenol, and the like; alkyl and aryl amines, e.g., primary amines such as methylamine, ethylamine, aniline, m-toluidine, 2,3-xylidine, mesidine, 1-napthylamine, 3-biphenylamine, benzylamine, furfurylamine, and the like as well as secondary amines of which dimethylamine is representative. It will be appreciated that derivatives of these compounds may also be used as reactants to effect condensation of the alkylene oxides. Thus, alkoxy, nitro, the halo groups, and other like noninterfering substituents may be attached to the molecular moieties of these compounds. In general, these compounds contain from 1 to 30 carbon atoms per molecule and have at least one substituent group containing a reactive hydrogen atom.

It will be appreciated that the reaction products obtained by the process of this invention may be aliphatic, aromatic, or heterocyclic compounds, containing a linear chain within their molecular moieties. Usually these compounds have at least one hydroxy group per molecule. Among the reaction products that may be produced by this process are glycol ethers, hydroxy thiol-ethers such as 2-methylmercaptoethanol, 2-ethylmercaptoethanol and the like, and amino alcohols such as ethylaminoethyl alcohol, phenylaminoethyl alcohol, and the like, and homologs thereof. Also, these hydroxy compounds may have other substituents such as the halo groups, nitro groups, and the alkoxy groups.

Without being limited by any theory, it is believed that these products are formed when cleavage of the epoxy bridge of the alkylene oxide produces an intermediate radical having an electrophilic oxygen attached at one end and electrophobic carbon at the other end. Apparently the compound having an active hydrogen atom gives up the hydrogen atom to form a hydroxy group with the terminal oxygen; the remaining part of the compound then combining with the electrophobic carbon. Thus, ethylene oxide reacts with ethyl alcohol to produce glycolmonoethyl ether. In a like manner, ethanethiol and ethylene oxide are catalyzed to form 2-ethylmercaptoethanol. It will be appreciated that the distribution, conversion rates, and the total yields of reaction products produced by this reaction mechanism are dependent on the catalyst and operating conditions as well as the initial reactants being employed.

Several different aluminosilicate catalysts may be employed to promote the reactions contemplated by this invention. Catalysts may be prepared from aluminosilicates that contain a high concentration of hydrogen sites within an ordered internal structure. These hydrogen sites are produced by ionically bonding or chemisorbing hydrogen cations within the molecular structure of the aluminosilicate. Such bonding or chemisorption may be effected by base exchange of the aluminosilicate with a fluid medium containing the hydrogen cations; the resulting exchanged product thus acquiring an acid character.

Other aluminosilicates having a sparse distribution of hydrogen sites may also be employed as catalysts for the present process. The alkali metal and alkaline earth metal (e.g. sodium, lithium, calcium, potassium, and the like) forms of the synthetic and naturally occurring aluminosilicates, including zeolite A and the faujasites such as zeolites X and Y, may serve as catalysts. These zeolites are hereinafter described below in greater detail. Often these aluminosilicate catalysts are more effective for those reactions involving thiols and ethylene oxide as reactants.

Advantageously, the aluminosilicate catalysts having a high concentration of active hydrogen sites suitable to the purpose of this invention, may be prepared from a variety of naturally occurring or synthetic aluminosilicates. These aluminosilicates have exchangeable metal cations, i.e. alkali metals and alkaline earth metals which may be completely or partially replaced by conventional base exchanging with certain other metal cations and/or hydrogen cations to produce the necessary concentration of hydrogen sites within an ordered internal structure.

Although some aluminosilicates may be base exchanged with hydrogen cations to form effective catalysts for this invention, other aluminosilicates such as the synthetic aluminosilicate, zeolite X, are not stable to direct base exchange with hydrogen cations or are not structurally or thermally stable after a portion of their exchangeable metal cations have been replaced with hydrogen cations. Thus, it is often necessary to exchange other metal cations of these aluminosilicates to achieve the necessary stability within the ordered internal structure prior to the inclusion of the hydrogen cations. In effecting such stability, it has been found that base exchange of certain polyvalent metal cations such as those of the rare earth metals not only provide stability to the aluminosilicate, but also increase the concentration of hydrogen sites without the subsequent base exchange of hydrogen cations. Apparently, the presence of certain metal cations, especially those polyvalent cations having higher valences within the aluminosilicate, cause the formation of hydrogen sites within its ordered internal structure. It is believed that these metals, especially those which have valences of three or more, produce hydrogen sites within the aluminosilicate because of the spatial arrangement of the $AlO_4$ and $SiO_4$ tetrahedra which make up the ordered internal structure of the aluminosilicate. Within certain aluminosilicates, where nearly every other tetrahedron has an exchangeable cation site usually an alkali metal or alkaline earth metal, a polyvalent cation may be accommodated within chemical bond distance by neighboring cation sites. However, if this accommodation is not spatially feasible, it is believed that the polyvalent metal cation is hydrolyzed thereby reducing the valence by the addition of one or more, depending on its valence of hydroxy groups $(OH)^-$ and creating from water molecules, present in the aluminosilicate structure, a hydrogen cation for each $[OH]^-$ group which then occupies one of the sites vacated by the exchangeable metal cation.

In this manner, those metals having higher valences may provide a higher concentration of hydrogen sites within an aluminosilicate. It will be appreciated that the formation of hydrogen sites within an aluminosilicate may occur while base exchanging the metal cations of a naturally occurring or synthetic zeolite or during the formation of a synthetic zeolite in an ionizable medium. Furthermore, it will also be appreciated that the high concentration of hydrogen sites created by these metals may be further increased by subsequent base exchange with hydrogen cations or cations which are capable of being converted to hydrogen cations, such as ammonium ions.

It will be appreciated that the concentration of the hydrogen sites produced either by direct exchange to yield hydrogen cations or by hydrolysis of exchanged polyvalent metal cations within certain aluminosilicates as described above, may vary according to the cations employed, the degree of base exchange, as well as the aluminosilicate being treated. Accordingly, it has been determined that the aluminosilicates having at least 0.5 milliequivalent of hydrogen per gram of solid and preferably above about 0.75 milliequivalent of hydrogen per gram of solid provide effective acid catalysts for the purposes of this invention. It will be understood that this value indicates the total concentration of hydrogen cations present within an aluminosilicate and that the spatial concentration of these cations is dependent on the ordered internal structure of the specific aluminosilicate being treated.

Because the unique activity of the aluminosilicate catalyst for effecting the present reactions is also dependent on the availability of the active sites, the defined pore size of the aluminosilicate is to be considered when preparing the catalyst of this invention. Generally, the aluminosilicate should have a pore size of such dimension that it can accept the cyclic reactants and also permit egress of the hydroxy products and the like from within its ordered internal structure. Preferably, the pore size is within the approximate range of 5 A. to 15 A. in diameter. It will be appreciated that the pore size desired for the aluminosilicate catalysts will depend on the compounds being reacted as well as the reaction products being produced.

In addition, the stability and distribution of active cation sites formed within the aluminosilicate is also effected by the silicon to aluminum atomic ratio within its ordered internal structure. It has been found that aluminosilicates having a high silicon to aluminum atomic ratio are more desirable for preparing certain catalysts of this invention. Preferably the silicon to aluminum atomic ratio is at least 1.8. These catalysts are readily treated with solutions that contain hydrogen ions and are readily regenerable after having been used by contact at elevated temperatures with an oxygen containing stream at controlled conditions such that the carbonaceous residues may be efficiently removed without damage to the essential structure and properties of the catalyst.

In addition, it has been found that the aluminosilicate catalysts, particularly the alkali metal salts, may be continuously activated while on stream by introduction of carbon dioxide into the reactor containing the catalyst. This oxygen containing gas may be introduced with the feed charge stream or in separate streams if desired. In general, the molar ratio of the reactants and carbon dioxide may range from about 0.001 to about 0.5.

Typical of the aluminosilicates employed in accordance with this invention, are several aluminosilicates, both natural and synthetic, which have a defined pore size of from 5 A. to 15 A. within an ordered internal structure. These aluminosilicates can be described as a three dimensional framework of $SiO_4$ and $AlO_4$ tetrahedra in which the tetrahedra are crosslinked by the sharing of oxygen atoms whereby the ratio of the total aluminum and silicon atoms to oxygen atoms is 1:2. In their hydrated form, the aluminosilicates may be represented by the formula:

$$M_{2/n}O:Al_2O_3:wSiO_2 \cdot yH_2O$$

wherein M is a cation which balances the electrovalence of the tetrahedra, $n$ represents the valence of the cation, $w$ the moles of $SiO_2$, and $y$ the moles of $H_2O$. The cation can be any one or more of a number of metal ions depending on whether the aluminosilicate is synthesized or occurs naturally. Typical cations include sodium, lithium, potassium, calcium, and the like. Although the proportions of inorganic oxides in the silicates and their spatial arrangement may vary, effecting distinct properties in the aluminosilicates, the two main characteristics of these materials is the presence in their molecular structure of at least 0.5 equivalent of an ion of positive valence per gram atom of aluminum, and an ability to undergo dehydration without substantially effecting the $SiO_4$ and $AlO_4$ framework.

One of the crystalline aluminosilicates utilized by the present invention is the synthetic faujasite designated as zeolite X, and is represented in terms of mole ratios of oxides as follows:

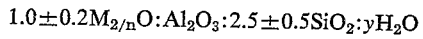
$$1.0 \pm 0.2 M_{2/n}O : Al_2O_3 : 2.5 \pm 0.5 SiO_2 : yH_2O$$

wherein M is a cation having a valence of not more than 3, $n$ represents the valence of M, and $y$ is a value up to 8, depending on the identity of M and the degree of hydration of the crystal. The sodium form may be represented in terms of mole ratios of oxides as follows:

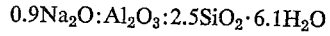
$$0.9 Na_2O : Al_2O_3 : 2.5 SiO_2 \cdot 6.1 H_2O$$

Zeolite X is commercially available in both the sodium and the calcium forms. Other aluminosilicates are contemplated as also being effective catalytic materials for the invention. Of these other aluminosilicates, a syntheic faujasite, having the same crystalline structure as zeolite X and designated as zeolite Y has been found to be active. Zeolite Y differs from zeolite X in that it contains more silica and less alumina. Consequently, due to its higher silica content this zeolite has more stability to the hydrogen ion than zeolite X.

Zeolite Y is represented in terms of mole ratios of oxides as follows:

$$0.9 \pm 0.2 Na_2O : Al_2O_3 : WSiO_2 \cdot XH_2O$$

wherein W is a value greater than 3 up to about 6 and X may be a value up to about 9.

In addition, the synthesized crystalline aluminosilicate designated as zeolite A, has been found to be effective for the purpose of this invention. This zeolite may be represented in mole ratios of oxides as follows:

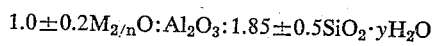
$$1.0 \pm 0.2 M_{2/n}O : Al_2O_3 : 1.85 \pm 0.5 SiO_2 \cdot yH_2O$$

wherein M represents a metal, $n$ is the valence of M, and $y$ is any value up to about 6.

The sodium form of this zeolite may be represented by the following formula:

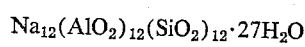
$$Na_{12}(AlO_2)_{12}(SiO_2)_{12} \cdot 27 H_2O$$

This material, often designated as a "4A" zeolite, has a pore size of about 4 A. in diameter. When the sodium cations have been substantially replaced with calcium (two sodium cations being removed for one calcium cation) by conventional exchange techniques, the resulting zeolite is designated as a "5A" zeolite and has a defined pore size of about 5 A. in diameter within its ordered internal structure.

Another aluminosilicate material found to be active in the present condensation process is a naturally occurring zeolite known as mordenite. This zeolite has an ordered crystalline structure having a ratio of silicon atoms to aluminum atoms of about 5 to 1. In its natural state it usually appears as a salt which may be represented by the following formula:

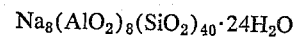
$$Na_8(AlO_2)_8(SiO_2)_{40} \cdot 24 H_2O$$

Mordenite has an ordered crystalline structure made up of chains of 5-membered rings of tetrahedra. The crystal has a system of parallel channels having free diameters larger than 6.5 A., interconnected by smaller channels, parallel to another axis, on the order of 8 A. free diameters. As a result of this different crystalline framework mordenite in proper ionic forms, can sorb benzene and cyclic hydrocarbons.

It will be appreciated that other aluminosilicates can be employed as catalysts for the described processes of this invention. A criterion for each catalyst is that its ordered internal structure must have defined pore sizes of sufficient diameters to allow entry of the preselected reactants and the emergence of the desired reaction products. Furthermore, the aluminosilicate advantageously should have ordered internal structure capable of chemisorbing or ionically bonding additional metals and/or hydrogen ions within its pore structure so that its catalytic activity may be altered for a particular reaction. Among the naturally occurring crystalline aluminosilicates which can be employed are faujasite, heulandite, clinoptilolite, chabazite, gmelinite, mordenite and dachiardite.

One of the preferred aluminosilicate catalysts is prepared from the sodium form of synthetic faujasite, e.g., zeolite X which is commercially available as 13X Molecular Sieve. Another preferred catalyst is the rare earth exchanged zeolite X which has a high concentration of hydrogen sites. This catalyst is also prepared from the sodium form of zeolite X, as the result of a conventional treatment involving partial replacement of the sodium by contact with a fluid medium containing cations of at least one of the rare earth metals. Any medium which will ionize the cations without affecting the crystalline structure of the zeolite may be employed. After such treatment the resulting exchanged product is water washed, dried, and dehydrated. The dehydration thereby produces the characteristic system of open pores, passages or a cavity of crystalline aluminosilicate.

As a result of the above treatment, the rare earth exchanged aluminosilicate is an activated crystalline catalyst material in which the molecular structure has been changed by having metallic rare earth cations and hydrogen cations chemi-sorbed or ionically bonded thereto. It will be understood that the hydrogen cations found within the aluminosilicate result from the hydrolysis of the rare earth cations in a manner heretofore described. Because specific rare earth metal cations as well as a mixture of several different rare earth metal cations may be base exchanged with the aluminosilicate, the concentration of hydrogen cation sites produced within the catalyst may vary depending on the completeness of the exchange as well as the rare earth cations employed. Thus, it has been found that the rare earth exchanged zeolite X catalyst of this invention may contain from about 0.5 to about 1.0 milliequivalent of hydrogen per gram of solid catalyst. Furthermore, it will be appreciated that the defined pore size of the rare earth exchanged zeolite X may vary from above 6 A., generally from 6 A. to 15 A., and preferably in the approximate range of 10 A. to 15 A. in diameter.

Advantageously, the rare earth cations can be provided from the salt of a single metal or preferable mixture of metals such as a rare earth chloride or didymium chlorides. Such mixtures are usually introduced as a rare earth chloride solution which, as used herein, has reference to a mixture of rare earth chlorides consisting essentially of the chlorides of lanthanum, cerium, praseodymium, and neodymium, with minor amounts of samarium, gadolinium, and yttrium. This solution is commercially available and contains the chlorides of a rare earth mixture having the relative composition cerium (as $CeO_2$) 48% by weight, lanthanum (as $La_2O_3$) 24% by weight, praseodymium (as $Pr_6O_{11}$) 5% by weight, neodymium (as $Nd_2O_3$) 17% by weight, samarium (as $Sm_2O_3$) 3% by weight, gadolinium (as $Gd_2O_3$) 2% by weight, yttrium (as $Y_2O_3$) 0.2% by weight, and other rare oxides 0.8% by weight. Didymium chloride is also a mixture of rare earth chlorides, but having a low cerium content. It consists of the following rare earths determined as oxides: lanthanum, 45–56% by weight; cerium, 1–2% by weight; praseodymium, 9–10% by weight; neodymium, 32–33% by weight; samarium, 5–6% by weight; gadolinium, 3–4% by weight; yttrium, 0.4% by weight; other rare earths 1–2% by weight. It is to be understood that other mixtures of rare earths are equally applicable in the instant invention.

It will be appreciated that zeolite X may also be base exchanged with the rare earth metal cations followed by additional exchange with a fluid medium containing hydrogen cations or a compound convertible to hydrogen cations such as ammonium chloride. The resulting rare earth-hydrogen exchanged zeolite X will also serve as an effective acid catalyst material; one difference being that its concentration of hydrogen sites will be greater than the above-described zeolite X catalyst material.

It will also be appreciated that cations of polyvalent metals other than the rare earths may be employed to replace the exchangeable cations from the aluminosilicates to provide effective catalysts for this process; those having a valence of three or more being preferred for preparation of a high concentration of acid sites. Exemplary of such metals are the lower valence metals silver, cobalt, nickel, zinc, and the higher valence metals vanadium, chromium, manganese, iron, and the like. However, the chemical properties of the metal, i.e. its atomic radius, degree of ionization, hydrolysis constant and the like, will determine its suitability for exchange with a particular aluminosilicate. In addition, metals such as calcium, magnesium, barium, and the like may be used with ammonium chloride or similar ammonium compounds to produce aluminosilicate catalysts for this invention by conventional base exchange techniques; the ammonium cations being decomposed to form hydrogen sites by heating of the exchanged aluminosilicate to drive off ammonia.

Other effective catalysts can be prepared from zeolite Y. Thus, zeolite Y may be further activated by the same base exchange techniques employed for the rare earth exchanged zeolite X catalyst. It has been found that the exchange of rare earth cations for the sodium cations within zeolite Y produces a highly active acid catalyst. However, because of the high acid stability produced by a high silicon to aluminum ratio, the preferred acid form of zeolite Y is prepared by partially replacing the sodium cations with hydrogen cations. This replacement may be accomplished by treatment with a fluid medium containing hydrogen cations, and/or cations capable of conversion to hydrogen cations. Inorganic and organic acids represent the source of hydrogen cations, whereas ammonium compounds are representative of the cations capable of conversion to hydrogen ions. It will be appreciated that the fluid medium may contain a hydrogen cation, an ammonium cation or a mixture thereof, in a pH range from about 1 to about 12.

The zeolite A designated as the "5A" zeolite may also serve as a catalyst. Although this material may be further exchanged with other divalent metal cations in a manner similar to that described for the synthetic faujasite, preferably it is used in its calcium form.

Mordenite is activated to serve as a catalyst for the instant invention by replacement of the sodium cations with hydrogen cations. The necessary treatment is essentially the same as that described above for the preparation of the acid zeolite Y, except that a mineral acid such as HCl is used as a source of hydrogen cations. In general, the mordenite is reduced to a fine powder and then acid treated.

The aluminosilicate catalyst may be employed directly as a catalyst or it may be combined with a suitable support or binder. The particular chemical composition of the latter is not critical. It is, however, necessary that the support or binder employed be thermally stable under the conditions at which the conversion reaction is carried out. Thus, it is contemplated that solid porous adsorbents, carriers and supports of the type heretofore employed in catalytic operations may feasibly be used in combination with the crystalline aluminosilicate. Such materials may be catalytically inert or may possess an intrinsic catalytic activity or an activity attributable to close association or reaction with the crystalline aluminosilicate. Such materials include by way of examples, dried inorganic oxide gels and gelatinous precipitates of alumina, silica, zirconia, magnesia, thoria, titania, boria and combinations of these oxides with one another and with other components. Other suitable supports include activated charcoal, mullite, kieselguhr, bauxite, silicon carbide, sintered alumina and various clays. These supported crystalline aluminosilicates may feasibly be prepared as described in copending application of Albert B. Schwartz Ser. No. 147,722 filed Oct. 26, 1961 by growing crystals of the aluminosilicate in the pores of the support. Also, the aluminosilicate may be intimately composited with a suitable binder, such as inorganic oxide hydrogel or clay, for example by ball milling the two materials together over an extended period of time, preferably in the presence of water, under conditions to reduce the particle size of the aluminosilicate to a weight mean particle diameter of less than 40 microns and preferably less than 15 microns. Also, the aluminosilicate may be combined with an distributed throughout a gel matrix by dispersing the aluminosilicate in powdered form in an inorganic oxide hydrosol. In accordance with this procedure, the finely divided aluminosilicate may be dispersed in an already prepared hydrosol or, as is preferable, where the hydrosol is characterized by a short time of gelation, the finely divided aluminosilicate may be added to one or more of the reactants used in forming the hydrosol or may be admixed in the form of a separate stream with streams of the hydrosol-forming reactants in a mixing nozzle or other means where the reactants are brought into intimate contact. The powder-containing inorganic oxide hydrosol sets to a hydrogel after lapse of a suitable period of time and the resulting hydrogel may thereafter, if desired, be exchanged to introduce selected ions into the aluminosilicate and then dried and calcined.

The inorganic oxide gel employed, as described above as a matrix for the metal aluminosilicate, may be a gel of any hydrous inorganic oxide, such as, for example, aluminous or siliceous gels. While alumina gel or silica gel may be utilized as a suitable matrix, it is preferred that the inorganic oxide gel employed be a cogel of silica and an oxide of at least one metal selected from the group consisting of metals of Groups II–A, III–B, and IV–A of the Periodic Table. Such components include for example, silica-alumina, silica-magnesia, silica-zirconia, silica-thoria, silica-beryllia, silica-titania as well as ternary combinations such as silica-alumina-thoria, silica-alumina-zirconia, silica-alumina-magnesia and silica-magnesia-zirconia. In the foregoing gels, silica is generally present as the major component and the other oxides of metals are present in minor proportion. Thus, the silica content of such gels is generally within the approximate range of 55 to 100 weight percent with the metal oxide content ranging from zero to 45 weight percent. The inorganic oxide hydrogels utilized herein and hydrogels obtained therefrom may be prepared by any method well-known in the art, such as for example, hydrolysis of ethyl orthosilicate, acidification of an alkali metal silicate and a salt of a metal the oxide of which it is desired to cogel with silica, etc. The relative proportions of finely divided crystalline aluminosilicate and inorganic oxide gel matrix may vary widely with the crystalline aluminosilicate content ranging from about 2 to about 90 percent by weight and more usually, particularly where the composite is prepared in the form of beads, in the range of about 5 to about 50 percent by weight of the composite.

The catalyst of aluminosilicate employed in the process of this invention may be used in the form of small fragments of a size best suited for operation under the specific conditions existing. Thus, the catalyst may be in the form of a finely divided powder or may be in the form of pellets of 1/16″ to 1/8″ size, for example, obtained upon pelleting the aluminosilicate with a suitable binder such as clay. The zeolite X, described hereinabove, may be obtained on a clay-free basis or in the form of pellets in which clay is present as a binder.

The present process may be carried out over a relatively wide range of reaction temperatures. In general, the reaction may begin at temperatures as low as 0° C. when contacting the aluminosilicate catalyst. Usually, the reactions are conducted at temperatures below about 400° C. Preferably, the process of this invention operates from about 50° to about 250° C. In general, the temperatures required for effecting reaction of hydroxy-substituted compounds, such as ethyl alcohol, and the gaseous alkylene oxides such as ethylene oxide, are conducted at temperatures below 300° C.; whereas, reactions of the mercapto-substituted compounds, such as ethanethiol with ethylene oxide, are conducted at temperatures below 200° C. Because these reactions are exothermic, it is desirable to utilize heat exchanger or cooling means with the reactor containing the catalyst in order to control the temperature of the process. Often the use of inert gases for diluting the gaseous reactants may serve as a temperature control.

Thus, it will be appreciated that the reaction temperature is usually determined by the reactivity of the reactants; however, the activity of the aluminosilicate catalyst must also be taken into consideration. For instance, those aluminosilicates containing a high concentration of hydrogen sites, such as acid mordenite and rare earth exchanged zeolite X, have been found to be particularly suitable for reactions involving the less reactive compounds or those compounds which have less tendency to polymerize or decompose at the temperatures often produced by the exothermic reactions of this process. In other instances, the aluminosilicate catalyst containing a low concentration of hydrogen sites such as the alkali metal and alkaline earth metal faujasites are effective as catalysts for reactions involving the mercapto-substituted aliphatic compounds and the like which are often accompanied with side reactions such as polymerization of sulfide intermediates.

At the higher temperatures in the operating range where the reactants are gaseous, formation of coke-like deposits caused by side reactions such as polymerization of sulfides of the alkylene oxides themselves, may reduce the availability of the active sites for contact with the reactants. Thus, it is often desirable to operate the present process in a liquid phase at temperatures within the preferred range of about 50° to 250° C.

Usually the operating pressures are equal to autogenous pressure or higher in order that either the reaction products or one of the reactants may be kept in a liquid phase. However, the process may operate from about atmospheric to superatmospheric pressures, e.g. 500 p.s.i.g. Often, it has been found that extended catalytic activity and improved yields of the reaction products may be obtained by effecting reactions at pressures of 300 p.s.i.g. or above.

The molar ratios between the alkylene oxides and the compounds containing an active hydrogen atom may be in stoichiometric proportions. Advantageously, a stoichiometric excess of the compound containing an active hydrogen atom is employed in carrying out the present process. Usually at least two and preferably about 4 to 10 moles of the active hydrogen containing compound are used per mole of alkylene oxide. Under these conditions it has been found that side reactions are suppressed and high conversion of reactants to the hydroxy compounds are promoted.

It will be appreciated that lower molecular ratios may be employed if an inert gas such as nitrogen, carbon dioxide, helium or the like is employed as a diluent or if a suitable solvent, which is a mutual solvent for both reactants is employed as reaction medium. Exemplary of some of these solvents are ethers, petroleum ethers, ketones, and the like organic solvents.

The amount of catalyst used to effect the reactions of this invention may vary considerably depending on whether the reactions are conducted as a batch-type operation, a continuous, or semi-continuous process. In general, during batch-type operation, the amount of catalyst may extend from about 0.5 percent by weight to about 20 percent by weight of the alkylene oxide reactant. Often, in continuous or semi-continuous processes where one or more reactor vessels are employed with cyclic regeneration of the catalyst, the amount of catalyst, measured in terms of liquid hourly space velocity of the alkylene oxide, may be in a range of from about 0.1 to about 10. It will be appreciated that the catalysts of this invention may be readily regenerated during cyclic continuous processes or after their use in batch-type operation by burning the contaminants off in a stream of oxygen-containing gas at an elevated temperature.

As will be realized, the operating conditions employed are dependent upon the specific reactions being effected. Such conditions as temperature, pressure, space velocity, presence of inert carrier gases or solvents or the like, will have important effects upon the process. Accordingly, the manner in which these conditions affect the process of this invention may be more readily understood by reference to the following specific examples.

The reactions are carried out continuously in a tubular reactor containing a fixed bed of an aluminosilicate catalyst wrapped with resistance wire and insulated with asbestos tape and aluminum foil for providing heat to the reaction medium. A variable transformer regulates the heat input. Also, a water jacket is positioned around the bottom half of the reactor to control the highly exothermic reactions. A water-cooled receiver is connected to the outlet of the reactor to condense and collect the fluid gas reaction products as they pass from the lower portion of the catalyst bed.

A mixture of the reactants is passed over the catalyst for an extended period of operation after the catalyst is raised to the reaction temperature.

The product stream is continuously passed into the receiver where the hydroxy products are condensed, removed and analyzed by vapor phase chromatography and infrared techniques.

A variety of aluminosilicate catalysts are employed in these runs in order to show their applicability for the present process. One of the catalysts was prepared from a sodium form of synthetic faujasite known as zeolite X having a pore size of approximately 13 A. Another catalyst was produced by exchanging such zeolite with cations of rare earth metals followed by washing, drying, and calcining in a manner heretofore described. In addition, catalysts were prepared from a hydrogen exchanged mordenite and the sodium form of zeolite Y. Also, a composite catalyst was prepared by incorporating equal parts by weight of a rare earth exchanged zeolite in a silica-alumina gel.

*Example I*

Ten grams of a rare earth exchanged 13X zeolite are placed in a tubular reactor and heated to a temperature of from 40° C. to 100° C. Then, gaseous ethylene oxide (2 moles per hour) and ethyl alcohol (2 moles per hour) are passed over the catalyst for a period of 10 hours. After an initial temperature rise, the reaction temperature is held at 80° C. During the run, a liquid product condensate is collected in the receiving system which upon fractional distillation gives a yield of 50 percent of ethoxy-ethanol.

*Example II*

Using the same procedure and apparatus described in Example I, 10 grams of rare earth exchanged 13X zeolite catalyst are placed in a reactor and heated to 50° C. Then gaseous ethylene oxide and liquid Cellosolve, i.e., ethylene glycol monoethyl ether, at a molar ratio of 1 to 1 are passed over the catalyst for 8 hours.

A liquid product is continuously collected and condensed in the water cooled receiver. Upon analysis by vapor phase chromatography this product was shown to be 40 percent of Carbitol, i.e., diethylene glycol monoethyl ether.

*Example III*

A tubular reactor is charged with 10 grams of a catalyst of acid mordenite and heated to 40° C. Then a solution of propylene oxide and ethyl alcohol at a molar ratio of propylene oxide to ethanol of 1:1 is charged into the reactor. After an immediate temperature rise of 20° C. the reaction temperature is maintained at 50° C. for a period of 8 hours. During the entire run, 500 grams of a liquid product is collected in the receiving system. Analysis by vapor phase chromatography indicated this product contained the following compounds:

| | Percent by wt. |
|---|---|
| Ethoxy propanol | 60 |
| Monoethyl ether dipropylene glycol | 20 |

*Example IV*

Using the same procedure previously described in Example I, 10 grams of a 13X zeolite catalyst is placed in a tubular reactor and raised to a temperature of 40° C. Then, 2 moles per hour of methanethiol and 2 moles per hour of ethylene oxide are mixed and passed into the tubular reactor. After 180 minutes at a temperature of 60° C., 450 grams of a liquid product is collected and fractionated to yield 325 grams of 2-methylmercaptoethanol.

*Example V*

Using a tubular reactor containing 10 grams of a 13X zeolite catalyst, 50 ml. per hour of a mixture of ethylene oxide and ethanethiol at a molar ratio of 1:1 are passed over the catalyst at a temperature of 100° C. After 8 hours on stream, 300 grams of a liquid product are condensed in the receiving system. After fractionation this product yields 170 grams of 2-ethylmercaptoethanol.

*Example VI*

Ten grams of a catalyst comprising the sodium form of zeolite Y are placed in a tubular reactor and heated to a temperature of 100° C. Then 40 ml. per hour of a mixture of ethylene oxide and ethylamine at 40° C. at a molar ratio of 1:1 are passed through the catalyst for 8 hours. The resulting product condensate is fractionated to yield 150 grams of ethylaminoethyl alcohol.

*Example VII*

A tubular reactor is packed with 10 grams of a composite catalyst of rare earth exchanged zeolite X contained in a silica-alumina gel and then heated to a temperature of 100° C. Then a mixture of 1 mole of aniline and 1 mole of ethylene oxide are passed through the catalyst in one hour. A liquid condensate is collected in the receiving system, fractionated and analyzed by vapor phase chromatography to yield 60 grams of phenylamino-ethyl alcohol.

*Example VIII*

Ten grams of rare earth exchanged 13X zeolite catalyst are placed in a tubular reactor and heated to 40° C. Then 97 grams of phenol and 44 grams of ethyl oxide are passed over the catalyst for 3 hours. At the end of this time, 120 grams of a liquid product are collected in the water-cooled receiver. Analysis of this product shows a 30 percent yield of a phenyl ether of ethylene glycol.

Examination of the results obtained by the examples shows that the aluminosilicate catalysts had consistently high selectivity for producing the hydroxy compounds over variable reaction conditions, and that the present process provides a high degree of control for determining the quantity and nature of the reaction products.

It will be appreciated that the examples set forth above, as well as the foregoing specification, are merely illustrative of the different compounds which may be produced by this process and that additional products may be formed in the presence of the aluminosilicates contemplated by this invention.

It will be further appreciated that other aluminosilicates may be employed as the catalysts for this process and that various modifications and alterations may be made in the process without departing from the spirit of the invention.

What is claimed is:

1. A process for promoting condensation of alkylene oxides which comprises effecting reaction of an alkylene oxide containing from 2 to 8 carbon atoms selected from the group consisting of unsubstituted alkylene oxides and alkylene oxides substituted with substituents selected from the group consisting of alkyl, aryl, the halo groups, nitro, and alkoxy groups and an organic compound selected from the group consisting of alkanols, alkanediols, phenols, alkanethiols, arylthiols, alkyl and aryl amines containing from 1 to 12 carbon atoms and compounds of this group further substituted by a radical selected from the group consisting of alkyl, halo, nitro, and alkoxy radicals in the presence of a catalyst comprising a crystalline aluminosilicate having active cation sites within an ordered internal structure; said internal structure having a defined pore size of from 5 A. to 15 A. whereby the aforenoted reactants are admitted within and the resulting reaction products are released from said catalyst.

2. The process of claim 1 in which said aluminosilicate has a silicon to aluminum ratio of at least 1.8 within an ordered internal structure.

3. The process of claim 1 in which said aluminosilicate is a faujasite.

4. The process of claim 1 in which said cations are selected from a group consisting of exchangeable metals, ammonium, hydrogen, and mixtures thereof.

5. The process of claim 1 in which said cations are of the rare earth metals.

6. The process of claim 1 in which said cations are selected from the group consisting of the alkali metals and the alkaline earth metals.

7. The process of claim 1 in which said aluminosilicate catalyst is a rare earth exchanged faujasite.

8. The process of claim 1 in which said aluminosilicate catalyst is hydrogen exchanged zeolite Y.

9. The process of claim 1 in which said aluminosilicate catalyst is hydrogen exchanged mordenite.

10. The process of claim 1 in which said aluminosilicate catalyst is contained in and distributed throughout a matrix binder material.

11. The process of claim 1 in which said reaction is conducted at sufficient pressure to produce a liquid phase.

12. A process for producing glycol ethers which comprises effecting reaction of ethylene oxide and ethyl alcohol in the presence of a rare earth exchanged faujasite at a temperature of from about 40° to about 250° C., and recovering a product of ethoxyethanol.

13. A process for producing glycol ethers which comprises effecting reaction of ethyleneglycol and ethylene oxide in the presence of a rare earth exchanged faujasite at a temperature of from about 40° to about 250° C., and recovering a product of diethylene glycol monoethyl ether.

14. A process for producing glycol ethers which comprises effecting reaction of propylene oxide and ethyl alcohol in the presence of acid mordenite at a temperature of from about 40° to about 250° C., and recovering a product of ethoxy propanol.

15. A process for producing hydroxy thioethers which comprises effecting reaction of ethylene oxide and methanethiol in the presence of a sodium form of faujasite at a temperature of from about 40° to about 200° C. and recovering a product of 2-methylmercapto-ethanol.

16. A process for producing hydroxy thio ethers which comprises effecting reaction of ethylene oxide and ethanethiol in the presence of a sodium form of faujasite at a temperature of from about 40° to about 300° C., and recovering a product of 2-ethylmercapto-ethanol.

References Cited

UNITED STATES PATENTS

| | | | |
|---|---|---|---|
| 2,174,761 | 10/1939 | Mannheim et al. | 260—458 |
| 3,033,778 | 5/1962 | Frilette | 260—614 X |
| 3,140,252 | 7/1964 | Frilette et al. | 260—614 X |

FOREIGN PATENTS

| | | |
|---|---|---|
| 593,569 | 3/1960 | Canada. |
| 618,760 | 4/1961 | Canada. |
| 558,646 | 9/1932 | Germany. |

OTHER REFERENCES

Anderson: "Refining of Oils and Fats," p. 99 (1953).

Japanese patent publication (3 pages spec.), 38/9147, June 1963.

LEON ZITVER, *Primary Examiner.*

CHARLES B. PARKER, *Examiner.*

R. PHILLIPS, T. MARS, *Assistant Examiners.*